Sept. 2, 1952 R. B. ZIEGLER 2,608,988
DISTRIBUTOR CONTROL SYSTEM FOR LIQUIDS
Filed Jan. 29, 1947 4 Sheets-Sheet 1
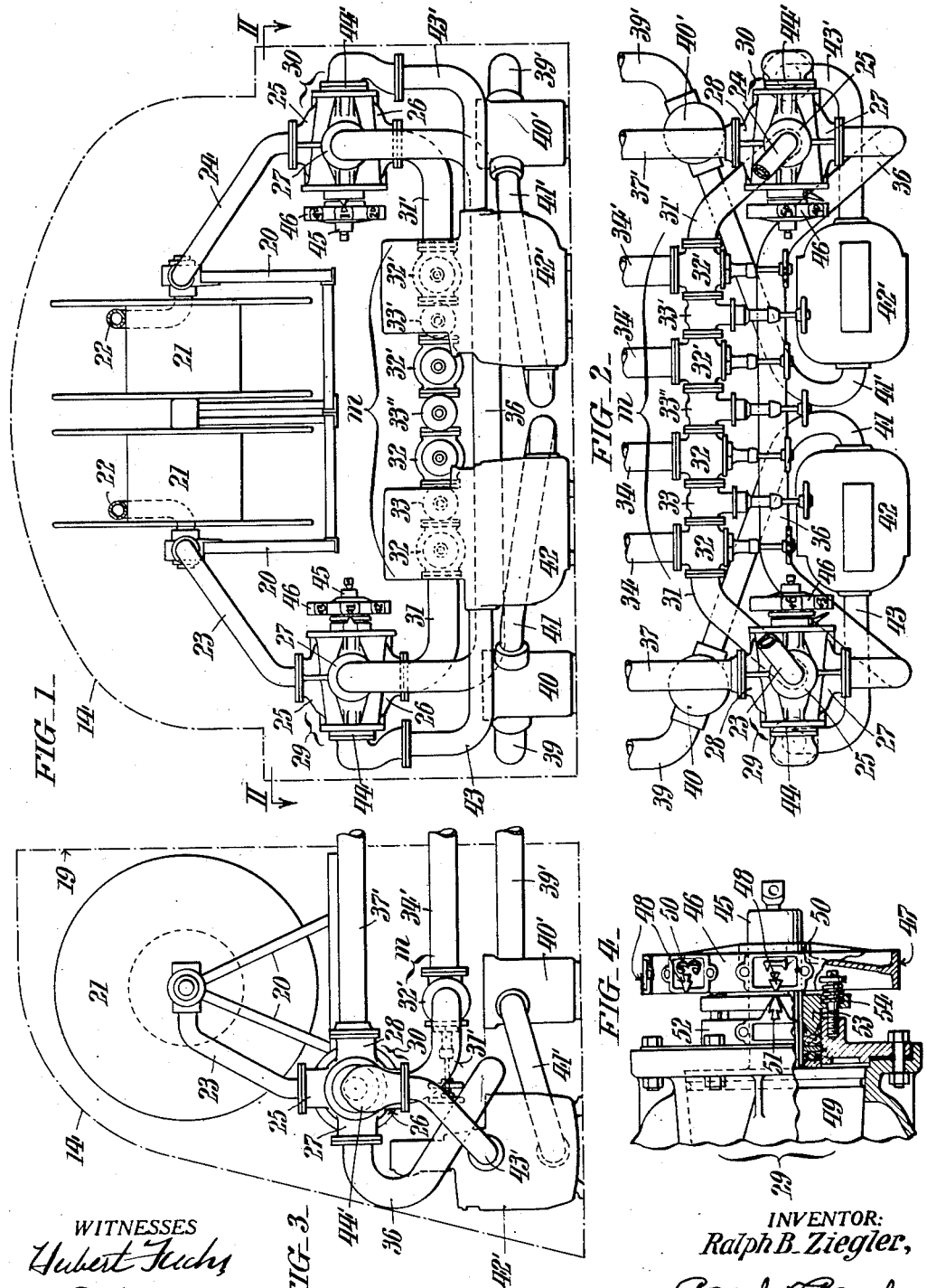
WITNESSES
Hubert Fuchs
Thomas W. Kerr, Jr.
INVENTOR:
Ralph B. Ziegler,
Paul & Paul
ATTORNEYS.

Sept. 2, 1952  R. B. ZIEGLER  2,608,988
DISTRIBUTOR CONTROL SYSTEM FOR LIQUIDS
Filed Jan. 29, 1947  4 Sheets-Sheet 2
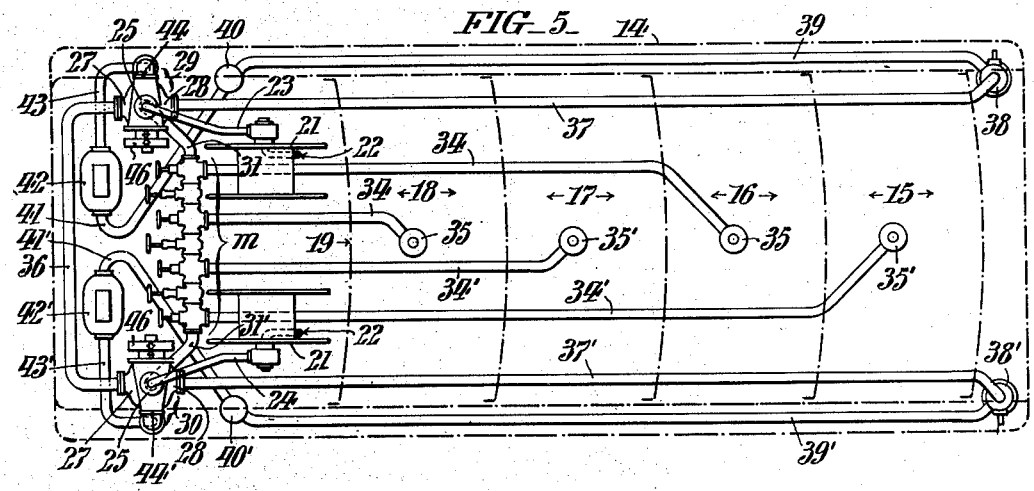
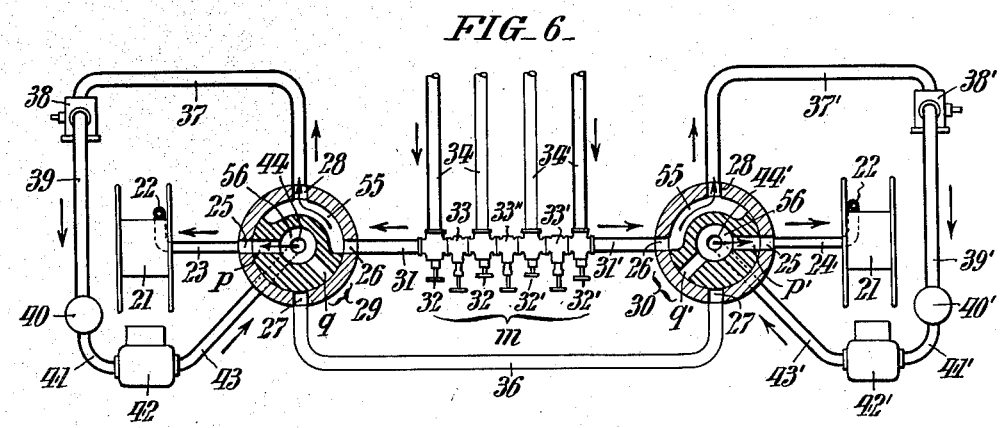
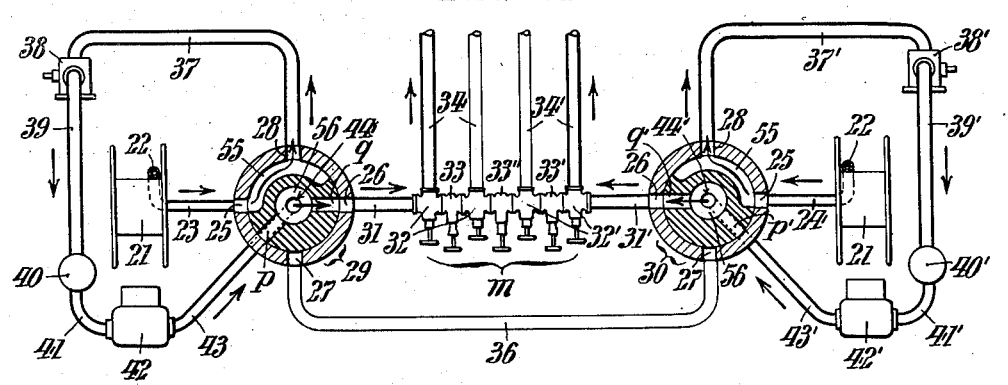
WITNESSES
Hubert Fuchs
Thomas W. Kerr, Jr.
INVENTOR:
Ralph B. Ziegler,
BY Paul & Paul
ATTORNEYS.

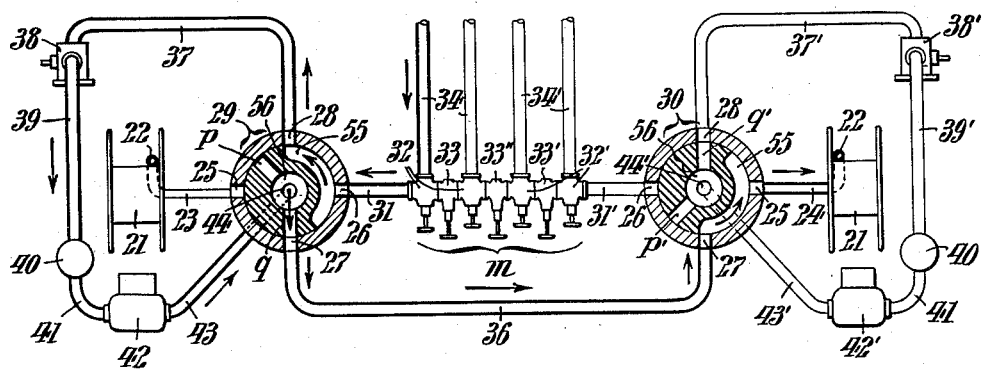

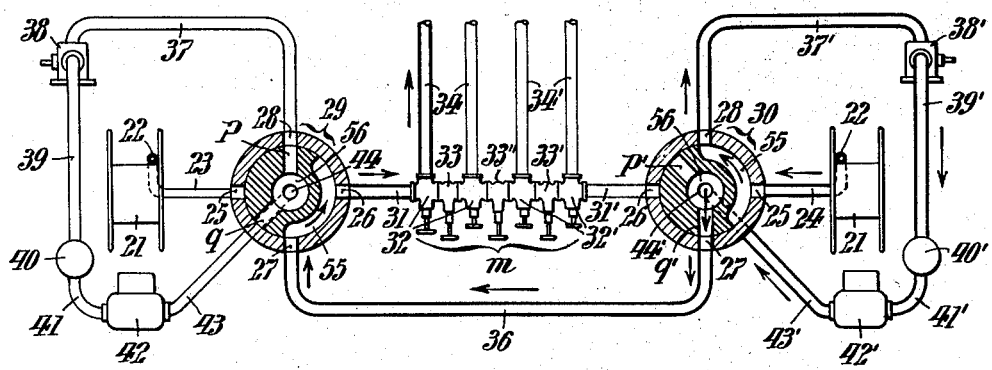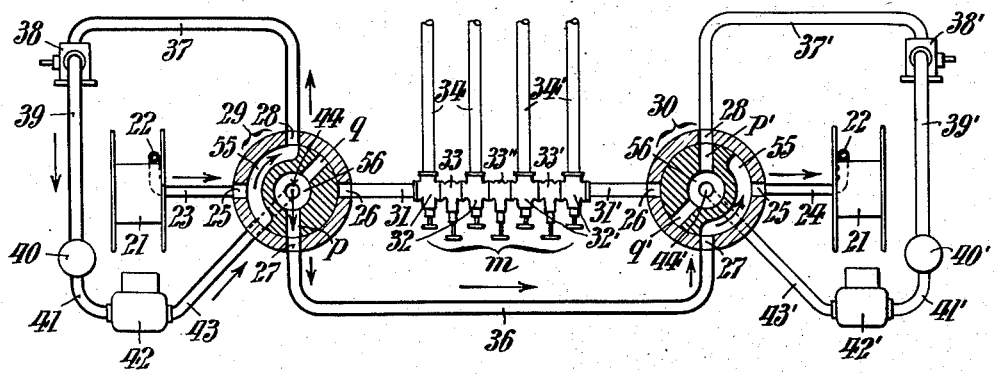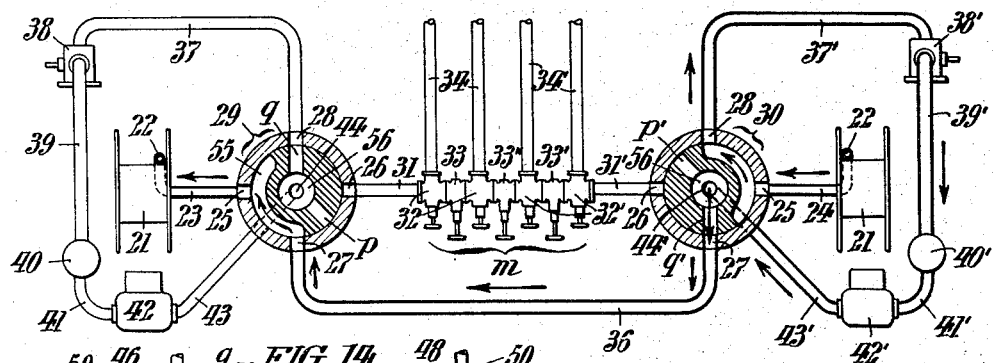

Patented Sept. 2, 1952

2,608,988

UNITED STATES PATENT OFFICE 2,608,988

DISTRIBUTOR CONTROL SYSTEM FOR LIQUIDS

Ralph B. Ziegler, Philadelphia, Pa., assignor to Philadelphia Valve Company, Philadelphia, Pa., a copartnership Application January 29, 1947, Serial No. 725,134

9 Claims. (Cl. 137—263)

This invention has general reference to distributor-control systems for liquids while it relates, more particularly, to the piping arrangement of tank vehicles or trucks such as are commonly used in the transportation of fuel oils, or gasoline and so forth, intended for the servicing of airplanes.

Tank trucks and similar vehicles at present generally used for the purpose of servicing airplanes are equipped with two complete pumping systems or sections, so that the tanks of two planes may be filled simultaneously in order to speed-up delivery. Frequently, however, different grades of gasoline are required on one and the same airplane, one grade being used for "warming-up" and "taking-off," and another grade for "cruising" or flying generally; hence it is desirable that the piping system on the trucks used should include a valve arrangement which permits selection of the grade of gasoline to be pumped for servicing purposes through either pumping section of said truck.

It is, accordingly, a fundamental aim of this invention to equip the piping system of tank vehicles or trucks, of the type above referred to, with means whereby selection of the grade or class of gasoline, fuel oil and so forth, may be expeditiously effected for servicing or withdrawal as desirable or expedient.

Another aim of this invention is the provision of a novel distributor-control system, of the species above indicated, which is also adapted to the balancing of airplanes due to the ease with which gasoline may be transferred from one wing tank to another in accommodating changes in the lading of such plane.

Still another object of my invention is the provision of a distributor-control piping system of the type indicated, in the two preceding paragraphs, further including provisions arranged to enable said system being usable as an external pump and metering system without disturbing the contents of the tank vehicle or truck compartments.

While the above stated objects are indicative in a general way of the aims of this invention others, with ancillary advantages, will be evident to those skilled in the art upon a full understanding of the practical embodiment thereof shown by the accompanying sheets of illustrative drawings; while said invention fundamentally consists of the parts and combinations of means hereinafter set forth and claimed, with the understanding that the necessary items therein included may be varied in construction, proportion and arrangement without departing from its spirit and scope. It is also to be further understood that this invention is applicable to other distributor-control systems; and that for the purpose of this disclosure I have merely selected a preferred type to which it appears to be particularly applicable.

In the drawings:

Fig. 1 is a rear end view of the main means involved in the improved distributor-control system for liquids as associated in a typical multi-compartment tank-vehicle, for the transportation and delivery of gasoline, fuel oils and so forth, the body of said vehicle being indicated by dot-and-dash outline only for the purpose of simplifying the illustration.

Fig. 2 is a plan view taken approximately as indicated by the angled-arrows II—II in Fig. 1, or with the hose reels and associated parts removed.

Fig. 3 is a side view of Fig. 1, as seen looking from the right towards the left hand thereof.

Fig. 4 is a fragmentary view, drawn to larger scale, of the head portion of one of the five-way control plug-valves forming a part of the improved distributor-control.

Fig. 5 is a diagrammatic plan view of the complete system, involved in the showing of Figs. 1 to 3 inclusive, with the tank vehicle indicated in dot-and-dash outline.

Fig. 6 is a fragmentary diagrammatic plan view of the rear portion of the improved distributor-control system with the associated plug-valves in position for normal delivery, from a servicing vehicle or truck of gasoline or the like, simultaneously to a pair of airplane tanks for example.

Fig. 7 is a similar view showing how the pumping from a source or sources of supply into a selected compartment or compartments of the servicing truck is normally effected.

Fig. 8 is a corresponding view illustrating how discharge from the left hand manifold of the system may be effected through the right hand control plug-valve and right-hand reel.

Fig. 9 is a similar view to the preceding but illustrating how discharge from the right hand side of the manifold is carried out by way of the left hand control plug-valve and left-hand reel.

Fig. 10 is a plan view showing how suction from a source of supply by way of the left hand pump through the right hand control plug-valve to a selected compartment or compartments of the truck is rendered possible.

Fig. 11 is a similar plan view to the preceding but showing how suction by way of the right hand pump through the left hand control plug-valve is also possible.

Fig. 12 is a plan view illustrating how transfer suction from the left hand reel through the left hand pump and meter, of the system, to the right hand reel is rendered possible.

Fig. 13 is a similar view to the preceding but showing the transfer suction reversed, or from the right hand side to the left hand side of the equipment.

Fig. 14 is a dial diagram hereinafter explained; and Fig. 15, sheet 3, is a diagram illustrating an additional feature preferably included in the system whereby two additional operations are made possible as hereinafter set forth.

In describing the form of this invention typified by the above identified drawings, specific terms will be employed for the sake of clarity, but it is to be understood the scope of said invention is not thereby limited; each such term being intended to embrace all reasonable equivalents which perform the same function for an analogous purpose; while, in all the views, corresponding parts are designated by like reference characters.

Referring more in detail to the drawings and firstly to Figs. 1–3 and 5, the outline of a conventional type of multi-compartment tank vehicle for the transport of liquids, such as different grades of gasoline and/or fuel oils, is comprehensively designated by the reference character 14; while the respective tank compartments are designated by the characters 15, 16, 17 and 18, and the customary rear-section or more commonly termed utility-box by the numeral 19, Figs. 3 and 5 only.

Conveniently supported in the utility-box 19, as by bearing means 20, are adjoining reels 21 for suitably nozzled hose 22, said hose connecting by way of opposingly inclined pipes 23, 24 with one, or the upper—25—for example, of four circumferentially-spaced or diametrically-opposed branches 25, 26, 27 and 28 about a pair of multiway control or distributing valves comprehensively designated 29, 30 and respectively individual to the related right and left hand pumping sections, hereinafter fully disclosed. More specifically, and for the purpose of clear differentiation the valves 29, 30 will be hereinafter designated the left-hand and right-hand distributor-control plug-valves respectively, while the associated piping connections leading therefrom and thereto will be correspondingly designated by like reference characters, with those to the right hand by like characters plus an added "prime" exponent. It is also to be particularly noted that the respective plug-valves 29, 30 are, preferably, of the five-way type disclosed in U. S. Patent No. 2,160,741, issued May 30, 1939, to James A. Jensen and Ralph B. Ziegler—the latter being the applicant in the instant case—excepting for structural changes later on fully set forth herein.

Leading from the branches 26 of the respective distributor-control-plug-valves 29, 30 are pipes 31, 31' connecting into a manifold m comprising a series of cross-valves 32, 32' with intervening gate valves 33, 33' and 33''; while from said cross-valves conduits 34, 34', with associated emergency valves 35, 35', communicate into the bottom of the respectively selected tank compartments 15—18, as later on again referred to. The branches 27 of the control plug-valves 29, 30 are in common flow-communication by a somewhat bail-shaped conduit 36; while the diametrically opposed branches 28 are respectively connected by pipes 37, 37' to individual pumps 38, 38', operative from any suitable source of power, such as the vehicle motor—not shown. From the pumps 38, 38' pipes 39, 39' connect to appropriate filters 40, 40', in turn communicating by conduits 41, 41' with conventional meters 42, 42' and, from the latter by way of pipes 43, 43' into the outer axial end branches 44, 44' of the respective plug-valves 29, 30.

Referring now, more particularly, to Fig. 4 it is to be noted that the stem 45 of each plug-valve 29, 30 has attached thereto a lever-arm (not shown) and a wheel or indicator-dial 46 the flat periphery 47 of the latter being preferably, spacedly sub-divided by suitable markers 48, in conformity with the respective positions the valve-plug 49, is to occupy in carrying out the various operative phases of this invention. These markers 48 are conveniently designated by single or plural characters 50, such as numerals, for example, corresponding to ten different schemes of flow or operation, as shown in Figs. 6 to 15, hereinafter set forth for registration with a stationary pointer 51 appropriately mounted on the rim 52 of the plug-valve packing-gland 53; whereas said gland is inwardly-influenced by pressure means 54 to ensure a leakage-proof joint around the valve stem 45, as readily understood by those conversant with the art. Thus it will be seen that anyone with normal intelligence, and the aid of a suitable chart giving the number and scheme of operation, can by simple rotation of the respective indicator dials 46 quickly set the valves 29, 30 which, in itself, is an important improvement needing no further amplification.

Having explained the main structural features of this invention references will now be had, more particularly, to Figs. 5–15; in describing the novel system of distributor-control made possible by the instant improvements; or otherwise expressed, the respective operations are briefly as follows. Assuming, for example only, that the tank compartments 15–18 are full of the same grade of gasoline, ready for normal service discharge at each side of the truck 14 into a pair of airplane tanks simultaneously, with all the gate-valves 33, 33', 33'' closed, and the outer cross-valves 32, 32' open. By reference to Fig. 6, or operation No. 1, which shows the position of the plug valves 29, 30 for normal discharge, say from the tank compartments 15, 16, all the operator has to do is to turn the left and right hand plug-valve indicator-dials 46 until the marker 48 thereon, bearing the number 1, registers with the associated pointer 51; whereupon the flow controlling arcuate-passage 55 in the respective distributor-valves 29, 30 will be moved into the position shown. Thus it will be understood, by following the associated arrows, that when the pump 38 is set in operation, discharge from the tank compartment 16 will be by way of the left hand outer conduit 34 to associated cross-valve 32 and pipe 31, branch 26, arcuate-passage 55, pipe 37 to pump 38, thence through pipe 39 to filter 40, conduit 41, meter 42, pipe 43 to plug-valve axial-branch 44, plug-bore 56 and radial-port p, branch 25 and inclined pipe 23, to the reel nozzled hose 22, and selected airplane tank—not shown. Concurrently with motivation of the pump 38' there will be simultaneous discharge from the truck tank compartment 15 through the outer conduit 34', associated cross-valve 32', pipe 31', branch 26, arcuate-passage 55, branch 28 and to said pump 38', and from thence by way of the pipe 39', filter 40', conduit 41', meter 42', pipe 43' to axial-branch 44' of plug-valve 30, and through the plug bore 56 and radial-port p' thereof, inclined pipe 24 to the associated reel nozzled hose 22; whereby there is effected a considerable saving in time and labor, with a material increase in servicing delivery; whereas it will be self-evident that by simply opening the gate valves 33, 33' and leaving the center gate-valve 33'' closed, a corresponding discharge may take place from the tank compartments 17, 18 by way of the inner conduits 34, 34'.

It is to be noted at this juncture that, in Figs. 6 to 13 inclusive, I have indicated the active flow conduits and pipes by heavy lines, with the corresponding parts that are inactive by relatively lighter lines in order to facilitate clearer reading of the drawings in conjunction with the flow-directing arrows.

Figure 7 illustrates operation No. 2 or how, by the simple expedient of turning the indicator-dials 46 till the number 2 registers with the pointer 51, concurrent suction from an airplane storage tank or tanks, for instance, through the hose 22 of the left and right hand reels 21, inclined pipes 23, 24, branches 25, arcuate passages 55, branches 28 and pipes 37, 37', of the respective distributor-control plug-valves 29, 30, to the pumps 38, 38' is obtained; and from the latter through the pipes 39, 39' filters 40, 40', conduits 41, 41', meters 42, 42', pipes 43, 43', to the axial branches 44, 44', plug-bores 56 and radial ports q, q', pipes 31, 31' to cross-valves 32, 32' of the manifold m and conduits 34, 34', into the tank compartments 16, 15 respectively. It will also be readily appreciated that by opening the gate-valves 33, 33' only a corresponding procedure can be followed via the inner conduits 34, 34' with respect to the tank compartments 17, 18.

Fig. 8 exemplifies operation No. 3 or how pumping from the left hand side of the manifold m through the left hand pump 38 and meter 42, out through the right hand hose 22 of reel 21 is carried out. In other words both indicator dials 46 are turned until the respective markers bearing the numeral 3 are in registration with the associated pointers 51. In such position, it will be observed that pumping from the tank compartment 16 is by way of the outer conduit 34 and outer cross-valve 32, pipe 31, branch 26, plug arcuate-passage 55, branch 28 and pipe 37 to pump 38; with discharge from said pump by way of the pipe 39 to filter 40, conduit 41, meter 42, pipe 43 into axial branch 44 of plug-valve 29, through the bore 56 and radial port q thereof, thence by way of branch 27 into the bail-shaped conduit 36, branch 27 of the right-hand plug valve 30 and arcuate passage 55, with outflow therefrom through the branch 25 inclined pipe 24 into the hose 22 of the right hand reel 21. It is to be particularly noted that the right hand pump 38', during the just described operation, is inactive, and that no flow is taking place through any of the associated conduits and pipes or other parts, of the right hand section than those specified as enabling discharge from the conduit 36 to the right hand hose 22.

Fig. 9 illustrates operation No. 4 or how the procedure of Fig. 8 may be reversed; that is to say how pumping from the right hand side of the manifold m through the right hand pump 38' and meter 42', and out through the left hand hose-reel 21 is carried out. Otherwise stated the procedure is as follows: The operator simply turns the left hand and right hand indicator-dials 46 until the respective marker numerals 4 thereon register with the associated pointers 51.

It will now be seen that flow from the tank compartment 15 is by way of the outer right hand conduit 34', outer cross-valve 32', pipe 31', plug-valve branch 26 and arcuate-passage 55 to branch 28 and pipe 37' to the right hand pump 38'; with discharge from the latter through pipe 39' to filter 40', conduit 41', meter 42' and pipe 43' to axial branch 44' of the plug valve 30, through the bore 56 and radial port q' and branch 27 thereof into the conduit 36, and therefrom by way of the branch 27 of the plug valve 29, arcuate-passage 55, branch 25 and inclined pipe 23 to the hose 22 of the left hand reel 21. It will be further understood that a corresponding flow may be effected from the tank compartment 17 by way of the inner conduit 34' by simply opening the gate-valve 33' intervening the two right hand cross-valves 32' of the manifold m; whereas the left hand pump 38 is not functioning for a similar reason to that explained in connection with Fig. 8.

Fig. 10 shows operation No. 5 or how suction from the left hand hose reel 21, through the left hand pump 38 and meter 42 into the right hand end of the manifold m may be carried out. With both indicator dials 46 turned to position designated 5 thereon, suction by way of the left hand reel hose 22 to the right hand end of the manifold m, when the left hand pump 38 operates is by way of the inclined pipe 23, plug valve arcuate passage 55, branch 28 and pipe 37 to said pump 38; with delivery from the latter through pipe 39 to filter 40, conduit 41, meter 42 and pipe 43 into axial-branch 44 and bore 56 of the plug valve 29; and thence through radial-port p, branch 27 and conduit 36 into branch 27 of right hand plug valve 30, arcuate passage 55 and branch 26 of said valve 30, pipe 31 to outer right hand cross valve 32' and associated conduit 34' into tank compartment 15.

Fig. 11 illustrates operation No. 6 or how suction from the right hand hose-reel 21 by the associated pump 38' through the meter 42' to the left hand end of the manifold m is rendered possible. The operator having turned both indicator dials 46 to bring the numerals 6 in registration with the associated pointers 51, on starting the pump 38', the resultant flow is as follows: Suction through the hose 22 of the right hand reel 21 effects flow through the branch 25 into the passage 55, and thence by way of the branch 28 and conduit 37' to the right hand pump 38', with discharge from the latter through pipe 39' to filter 40', conduit 41', meter 42' and pipe 43' into the axial branch 44' and plug bore 56 of the right hand plug valve 30. From the bore 56 flow continues by way of radial port q', branch 27 and conduit 36 into branch 27 of the left hand plug valve 29, thence through arcuate passage 55, branch 26, pipe 31, left hand outer cross-valve 32 and outer conduit 34 into the tank compartment 16.

Fig. 12 shows operation No. 7 or how transfer suction from the left hand hose reel 21 through the left hand pump 38 and meter 42 to the right hand hose reel 21 is accomplished. The operator having set the respective indicator dials 46 at marking numerals 7, and put the left hand pump 38 in operation, it will be observed that a suction flow takes place from the left hand through hose 22, inclined pipe 23 into plug valve branch 25 and arcuate passage 55, and thence by way of branch 28 and pipe 37 to the pump 38, which continues by way of pipe 39, filter 40, conduit 41, meter 42 and pipe 43 into axial branch 44 and plug bore 56 of the left hand plug valve 29; with outflow therefrom through radial port p and branch 27 into the conduit 36, and thence by way of branch 27, of the right hand plug valve 30, arcuate passage 55 and branch 25 into inclined pipe 24, with discharge through hose 22 of the right hand reel 21 to wherever required. It is to be observed that all of the conduits 34, 34'; cross valves 32, 32'; and associated pipes 31, 31' in the right and left hand sections of the distributor controlling means are all inactive so far as flow therethrough is concerned; which comment also applies to the form of operation now to be explained in connection with Fig. 13.

In the form of the system illustrated in Fig. 13, or operation No. 8, the operator having set the respective indicator dials 46 at the indicator marking 8 to effect transfer suction from the right hand hose reel 21 through the right hand pump 38' and meter 42' to the left hand reel 21, the flow is as follows. When the operator starts the pump 38' suction from the right hand reel hose 22, through the inclined pipe 24, branch 25, arcuate passage 55, branch 28 and pipe 37', to said pump 38' is initiated, with outflow therefrom by way of pipe 39' to filter 40'; conduit 41', meter 42', pipe 43' into the axial branch 44' and bore 56 of the right hand plug valve 30: thence by way of radial port q', branch 27, conduit 36, branch 27 into the arcuate passage 55 of the left hand plug-valve 29, with outflow from the latter by way of the branch 25 and inclined pipe 23 into the hose 22 of the left hand reel 21, for discharge where required or desired.

Reference is now made to Fig. 14 which schematically illustrates the relation of the indicator-dials 46 relative to the stationary pointers 51; it will be observed that the position of the left hand valve plug 49 is the same for the fourth-and-eighth, as well as the fifth-and-seventh operations; whereas the position of the right hand valve plug 49' is the same for the third-and-seventh, as well as the sixth-and-eighth operations. Accordingly the related markers 48 will bear two numbers and the remainder only one number, all of which will be readily understood by those conversant with the art.

Referring now to Fig. 15, there is therein diagrammatically shown an important adjunctive feature which is preferably associated with the means previously described; that is to say the outer left and right hand cross valves 32, 32' are respectively provided with a drain pipe 57, 57' and additional gravity gate valve 58, 58'. Each gravity gate valve 58, 58' affords provision whereby drainage from the manifold m may take place; or either gate valve 58, 58' may be used as a suction valve or as a discharge valve, so that by attaching hoses 59, 59' to said gate valves 58, 58' it is possible to use either the right or left hand pumping section as an external transfer pumping and metering system without in any way disturbing the commodity contained in the tank or compartments 15—18. In other words, when discharging by gravity through either or both gate valves 58, 58' the operator simply sets the indicator-dials 46 to position No. 6 and then opens the desired gravity gate valve 58, or 58'; or alternatively by opening the right hand gate valve 58' and starting the pump 38' an external transfer suction may be made from right hand gravity gate valve 58' and pipe 57', through pump 38' and meter 42', to right hand pipe 24 and hose 22 or vice versa, in a manner well understood by those conversant with the art from the preceding description.

From the foregoing the merits and advantages of this invention will be clearly understood inasmuch as the correct setting of the respective plug-valves 29, 30, for the desired service, simply entails movement or turning of the control valve-plugs 49, 49' into the numbered position for each operation; while the reduction in the number of valves and piping employed not only saves over all weight but also materially aids the flow of gasoline, through the respective systems, while affording a very compact distributor-controlling means.

Having thus described my invention, I claim:

1. In liquid distributor-controlling means for tank trucks and the like including plural pumping sections, with respectively associated conduit arrangements; a manifold intermediate said pumping sections and said manifold comprising cross-valves with intervening gate-valves; multi-way plug-valves connecting the respective ends of said manifold to an associated pumping section and conduit arrangement for control of supply to, and discharge from the respective tank compartments; and dial-means on the stem of each plug-valve, said dial means bearing spaced characters registerable with a stationary pointer on the associated plug-valve whereby, when said valves are set at corresponding characters, a selective flow through the respective conduit arrangements and associated pumping sections is positively assured.

2. In liquid distributor-controlling means for multi-compartment tank trucks and the like, plural pumping sections and external conduit arrangements, individual to the respective tank compartments; a manifold comprising cross-valves, controlling supply to and discharge from predetermined tank compartments; gate-valves intervening said cross-valves operative to effect corresponding supply to, and discharge from, the other tank compartments; multi-way plug-valves having connection to the manifold-end cross-valves; a common flow connection between said plug-valves, and the plug of each such valve including an axial-bore, arcuate passage and radial ports for variably controlling flow through said valves; and a dial-means carried by each plug bearing corresponding indicia for positioning the valve plugs for the desired flow therethrough, and movable therewith in respect to a stationary pointer, whereby when the said plugs are set at similar indicia, and the associated pump put in operation, a predetermined flow through each pump section and associated conduit arrangement, is positively obtained.

3. A liquid distributor-controlling means, in accordance with claim 2, wherein the plug valves are of the five-way type, wherein the dial-means consists of a control wheel-indicator having a flat peripheral portion spacedly sub-divided by distinctive character-bearing markers; and wherein two of said markers on each wheel-indicator have plural characters thereon, whereby provision is made for eight or more selective flow operations through the desired pumping sections and conduit arrangements.

4. The invention of claim 2 further including a hose-reel to each side thereof; wherein the conduit arrangements connect the respective manifold end cross-valves to individual tank compartments and the pumping sections; and wherein the dial-means each bear like position indicating numerals for the plug-valves, whereby discharge from, or suction into, the left and right hand pumping sections can be simultaneously effected by simply turning the dial-means of each plug-valve till the required numeral registers with the stationary pointer.

5. The invention of claim 2 further including a hose-reel to each side thereof; wherein the respective conduits connect the manifold cross-valve ends into associated tank compartments; wherein the respective plug-valves include a common flow connection; and wherein the dial-means bear corresponding numerals for positioning the plug-valves so that, when the related pump is set in operation, to selectively effect discharge from the left hand manifold end through the plug-valve common flow connection to the right hand hose-reel, and vice versa.

6. The invention of claim 2 further including a hose-reel to each side thereof; wherein conduits connect the manifold end cross-valves into associated tank compartments; wherein the respective plug-valves include a common flow connection; and wherein the dial-means bear corresponding numerals for positioning the plug-valves to selectively effect suction transfer of liquid through the left hand hose-reel and related pumping section into the right hand manifold end, plug-valve and hose-reel and vice versa.

7. The invention of claim 2 further including a hose-reel to each side thereof; wherein conduits connect the manifold ends into associated tank compartments; wherein the plug-valves include a common flow-connection; and wherein the dial-means bear corresponding numerals for positioning the plug-valves to selectively effect transfer suction from the left hand hose-reel and associated pumping section to and through the right hand plug-valve and hose-reel for discharge from the latter as desired, and vice versa.

8. The invention of claim 2 wherein the respective plug-valves have four circumferentially-spaced branches, and an axially-aligned branch; wherein a corresponding pair of the circumferential-branches are connected by a common flow-conduit; wherein pipes connect a second circumferential-branch of each valve to a related hose; wherein a pipe from a third circumferential-branch of each such valve connects into the related end of the manifold; wherein a loop-like conduit from the fourth circumferential-branch of the plug-valve has flow communication into the axial-branch thereof; and wherein each such loop-like conduit respectively includes a pump; a filter, and a suitable meter.

9. The invention of claim 2 further including a supplemental flow pipe from each outermost cross-valve with an associated gate-valve; and wherein means attachable to the respective supplemental gate-valves make additional provision for gravity drainage from each end of the manifold, as well as to effect external transfer of liquid by way of the right hand plug-valve and pumping section through the left hand pumping section, and vice versa, without disturbing the content of the tank compartments.

RALPH B. ZIEGLER.

REFERENCES CITED

The following references are of record in the file of this patent:

UNITED STATES PATENTS

| Number | Name | Date |
|---|---|---|
| 165,925 | Grzybowski | July 27, 1875 |
| 312,158 | Peeney | Feb. 10, 1885 |
| 1,035,502 | Smith | Jan. 27, 1914 |
| 2,015,946 | Marden | Oct. 1, 1935 |
| 2,078,384 | Jefferson | Apr. 27, 1937 |
| 2,160,741 | Jensen | May 30, 1939 |
| 2,356,786 | Harman et al. | Aug. 29, 1944 |
| 2,387,531 | Rose | Oct. 23, 1945 |